United States Patent  [15] 3,664,257
Meyer  [45] May 23, 1972

[54] PRODUCTION BROILER WITH HANGING FOOD HOLDERS

[72] Inventor: Alfred E. Meyer, Prospect Heights, Ill.
[73] Assignee: Anetsberger Brothers Inc., Northbrook, Ill.
[22] Filed: Oct. 2, 1970
[21] Appl. No.: 77,614

[52] U.S. Cl. ................................99/427, 99/386, 99/400, 99/402, 99/443 C, 99/446
[51] Int. Cl. .......................................................A47j 37/04
[58] Field of Search .................126/41 A, 41 C; 99/261, 352, 99/355, 393, 386, 399, 400, 402, 427, 446

[56] References Cited

UNITED STATES PATENTS

| | | | |
|---|---|---|---|
| 1,518,811 | 12/1924 | Murray | 99/386 |
| 2,718,188 | 9/1955 | Read et al. | 99/386 |
| 2,917,990 | 12/1959 | Ehrenberg | 99/386 |
| 2,928,524 | 3/1960 | Jensen | 99/386 X |
| 2,689,517 | 9/1954 | Angelus | 99/345 |
| 3,525,300 | 8/1970 | Genetti | 99/427 |

Primary Examiner—Billy J. Wilhite
Attorney—Davis, Lucas, Brewer & Brugman

[57] ABSTRACT

Production broiler with vertically disposed burner means defining a plurality of open-ended broiler spaces, an endless chain supported and driven by sprockets mounted on vertical axes, hangers spaced along and supported by the chain for movement longitudinally of the broiler spaces, food holders removably depending from the hangers by means of hanger-engaging portions spaced longitudinally from each other, each food holder comprising a first part engaging the hangers and a second part having a base pivotally mounted at its outer edge on the first part and a wall upstanding therefrom to define a tray for normally supporting a meat patty on edge, the weight of the patty maintaining the tray in closed position, a delivery chute, means for automatically moving the trays to open position to deliver patties therefrom into the chute, means operable automatically thereafter to move the trays to closed position, and normally inoperative deflector means selectively movable to operative position to effect automatic disengagement of the food holders from the hangers for cleaning purposes.

11 Claims, 6 Drawing Figures

Patented May 23, 1972

Inventor:
Alfred E. Meyer
By:
Davis, Lucas, Brewer & Brugman
Attys.

Patented May 23, 1972
3,664,257
2 Sheets-Sheet 2
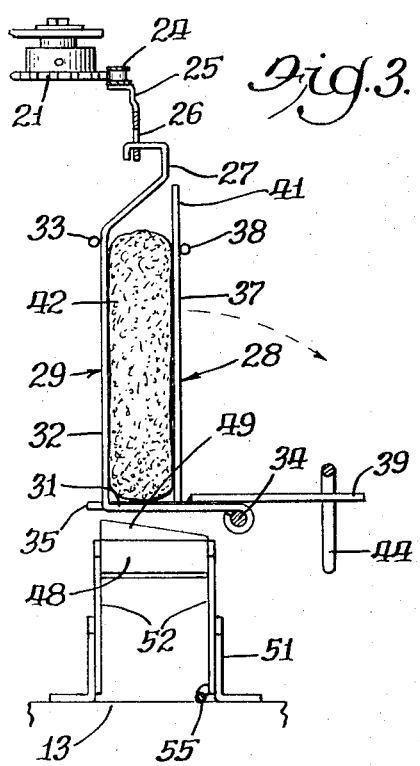
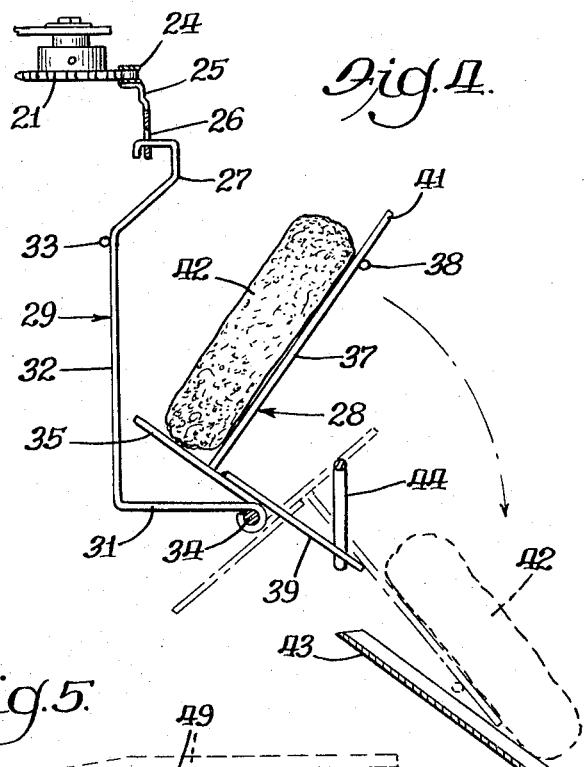
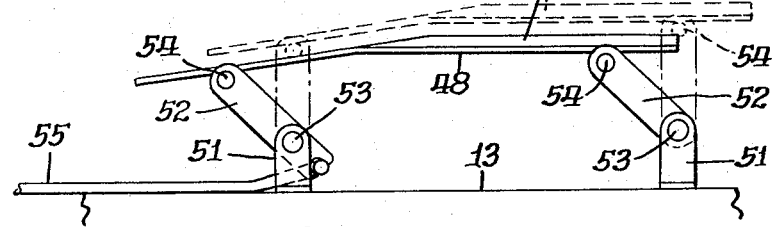
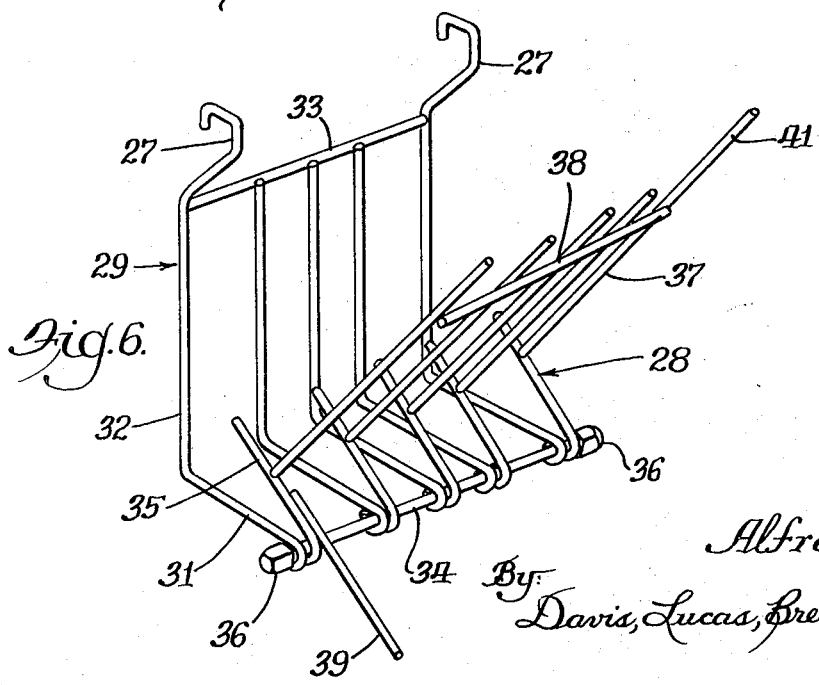
Inventor:
Alfred E. Meyer
By
Davis, Lucas, Brewer & Brugman
Attys.

3,664,257

PRODUCTION BROILER WITH HANGING FOOD HOLDERS

BACKGROUND OF THE INVENTION

1. Field of the Invention

This invention relates generally to food production equipment, and more particularly to machines for broiling meat patties, or the like, on edge to effect simultaneous broiling of both sides.

2. Description of the Prior Art

Generally similar production broilers are disclosed in the prior art. While the prior art employs a sprocket driven chain with depending hangers for hanging wire basket food holders thereon, an objectionable dirt and grease collecting trackway is employed to support the chain, the food holders must be placed on and removed from the hangers manually, and they are supported only at a single point so as to be readily susceptible of undesirable vertical twisting, especially as induced during direction changing movements of the chain. The prior art also employs very expensively constructed patty clamping means secured to and upstanding from a chain at the bottom of the device, which renders the machine substantially impossible to keep clean.

SUMMARY OF THE INVENTION

This invention overcomes the undesirable features of such prior art structures by employing an endless chain drivingly supported solely by sprockets mounted on vertical axes above open-ended broiler spaces, with hangers spaced from each other along and depending from the chain, and food holders readily removably carried in depending relationship by the hangers for continuous longitudinal movement through the broiler spaces, each food holder having hanger-engaging portions spaced longitudinally from each other for engaging different hangers to stabilize the food holders and avoid vertical twisting thereof. Each food holder comprises a first part including such hanger-engaging portions at its upper end and an outwardly extending horizontal floor, and a second part having a base with an outer edge pivotally mounted on the outer edge of the floor of the first part and a wall secured at its lower end to the base and defining a right angle therewith, the second part comprising a tray for a meat patty, or the like, whereby the weight of a patty therein normally maintains the tray in closed position. The broiler includes a delivery chute and tray-opening means to effect outward pivotal movement of each tray as it approaches the chute to automatically deliver a patty in the holder to the chute. Limiting means terminate the tray-opening movements and further operate automatically thereafter to effect tray-closing movements. Normally inoperative deflector means are provided for selective manual movement to operative position to automatically effect separation of the food holders from their hangers when it is desired to clean the same.

In the drawings

FIG. 3 is a detail elevation showing a food holder with its tray in closed position as it approaches the tray-opening means;

FIG. 4 is a detail elevation similar to FIG. 3 showing a tray in full lines in partially open position and in fully open position in broken lines;

FIG. 5 is a detail side elevation of the normally inoperative deflector means, with the same shown in operative position in broken lines; and FIG. 6 is a perspective view of one of the food holders with the tray portion thereof in partially open position.

DESCRIPTION OF THE PREFERRED EMBODIMENT

Figure 1:
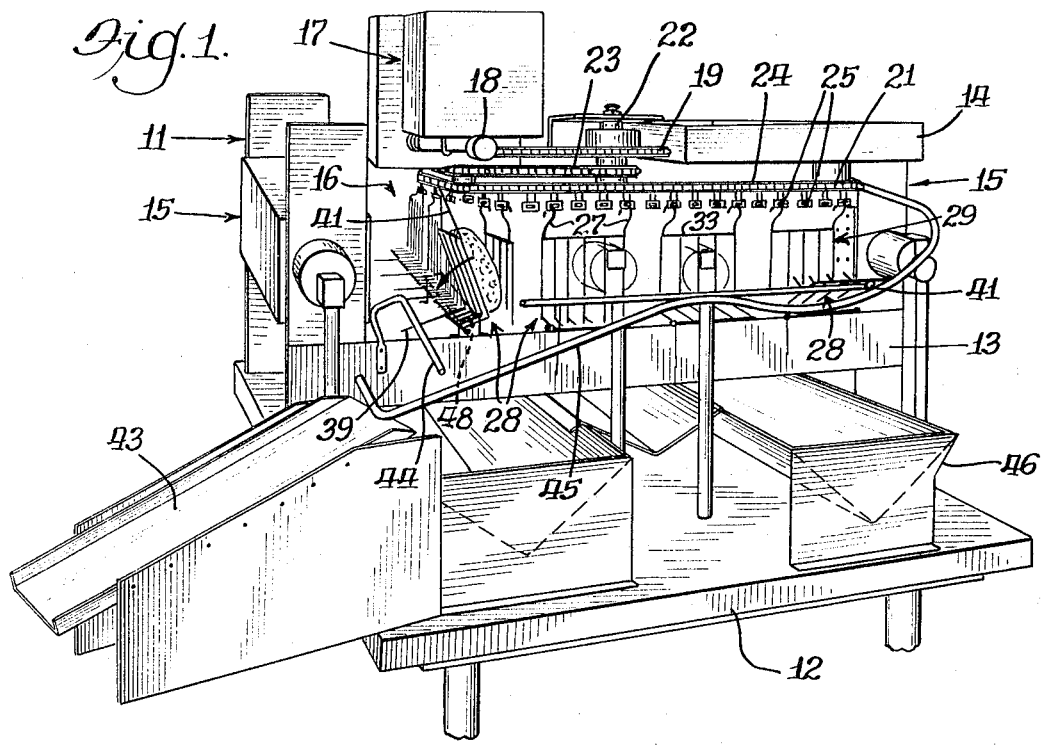
FIG. 1 is a perspective view of a production broiler embodying the features of the invention, as seen from the front thereof.
Figure 2:
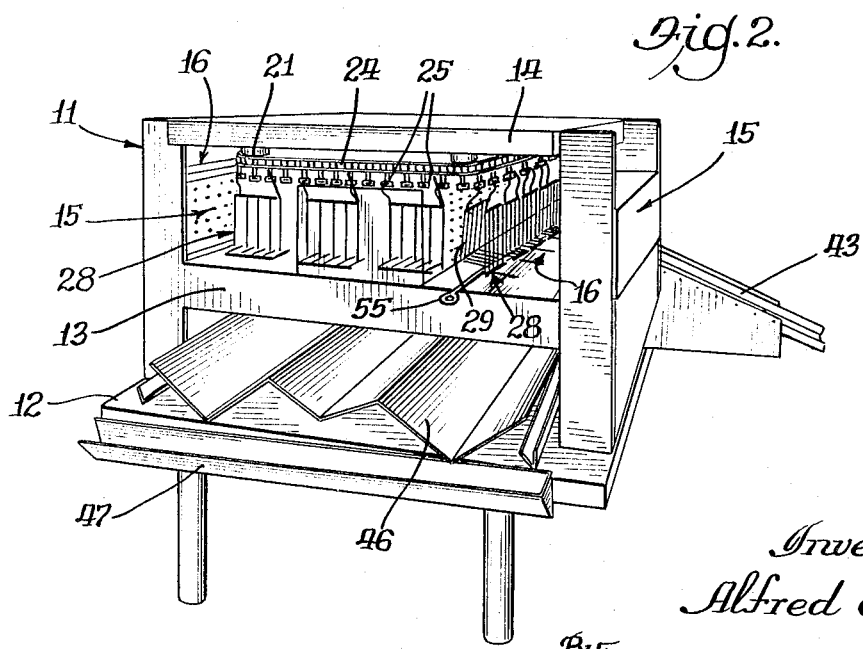
FIG. 2 is a similar view of the broiler of FIG. 1, as seen from the rear.

Referring more particularly to FIGS. 1 and 2, reference numeral 11 indicates in general a suitable frame for a production broiler embodying the features of the invention which includes a base 12, an intermediate portion 13 and an upper part 14. Suitable burner means 15 of any desired construction are mounted in well-known manner on the base 12 in laterally spaced relationship to each other to define a plurality of open-ended broiler spaces 16 therebetween.

Mounted on the upper part 14 is a motor means 17 (FIG. 1) of any suitable type and including speed change mechanism selectively controlled by a control member 18 for actuating a drive chain 19. A plurality of sprockets 21 are rotatably mounted on vertical axes suitably journalled and depending from the upper part 14 of the frame and disposed adjacent the ends of the broiler spaces 16, with at least one of the sprockets 21 being drivingly rotated by the chain 19, as through the agency of an intermediate sprocket assembly 22 and a second drive chain 23.

Engaging and supported solely by the sprockets 21 is an endless chain 24 having hangers 25 spaced from each other and secured thereto in depending relationship for continuous movement longitudinally of the broiler spaces 16 in response to operation of the motor means 17. As best seen in FIGS. 3 and 4, each of the these hangers 25 is suitably apertured adjacent its depending end at 26 to receive a hanger-engaging hook portion 27 extending upwardly from a food holder indicated generally by reference numeral 28.

As best seen in FIG. 6, each food holder 28 comprises a first part defining a vertical wall 29 terminating at its upper end in two of said hanger-engaging portions 27 which are spaced longitudinally from each other for engaging different hangers 25 to stabilize the food holder and avoid vertical twisting thereof. The vertical wall 29 of the first part of each food holder 28 terminates at its lower end in an outwardly extending horizontal floor 31. It is preferred that the vertical wall 29 and floor 31 be formed by means of bent rods 32 secured in parallel relationship to each other, as by means of a longitudinally extending rod 33 welded thereto, and that the hanger-engaging portions 27 comprise upward extensions of the end rods 32. The outer, lower ends of the rods 32 preferably are formed into loops to receive a hinge pin 34.

Each food holder 28 also includes a second part having a base 35 preferably formed by a plurality of parallel rods having their outer ends bent to form loops engaged by the hinge pin 34. Suitable securing nuts 36 are mounted on the ends of the hinge pin 34 to prevent separation of the base 35 from the floor 31. The second part of the food holder 28 also includes a second vertical wall 37 which preferably comprises a plurality of rods welded at their lower ends respectively to the rods forming the base 35 and defining right angles therewith, with such points of attachment of the wall 37 to the base 35 being a substantial distance inwardly from the outer edge of the latter or hinge pin 34. The upper end portions of the rods forming the wall 37 are secured together, as by means of a longitudinally extending rod 38 welded thereto. Each of the food holders 28 also includes a tailpiece 39 suitably secured to and extending outwardly from the base 35 of the second part and a finger 41 extending outwardly and upwardly from the wall 37 of the second part, which preferably comprises an extension of the forward end rod forming the wall 37.

As best seen in FIGS. 3 and 4, the second part of each holder 28, comprising the base 35 and wall 37 vertical with respect thereto, defines a tray for a meat patty 42, or the like. In its normal position of FIG. 3, this tray is maintained in closed position with the second wall 37 vertical and the patty 42 disposed on edge between that wall and wall 29. The patty 42 thus normally is so maintained on edge during broiling as it travels through the broiler spaces 16 by the weight of the patty resting upon the base 35 and the floor 31. Because of the substantial distance between the second wall 37 and the hinge pin 34 defining the outer edges of the members 31, 35, the weight of the patty thus assures a maximum tray-closing force being imposed as a moment about the pivot 34.

As best seen in FIGS. 1 and 2, a delivery chute 43 is disposed adjacent one corner of the frame 11. Means are provided for automatically delivering a broiled patty 42 into this chute as the food holder 28 completes its broiling run through the spaces 16 and arrives opposite the chute. To accomplish this, tray-opening means comprising a rail 44 (FIG. 1) is secured at one end in any suitable manner to the intermediate portion 13 of the frame and is bent to provide a free end extending downwardly and forwardly in the normal path of movement of the tailpieces 39 on the holders 28. As best seen in FIGS. 3 and 4, as each food holder 28 is moved forwardly in approaching the location of the upper end of the chute 43, its tailpiece 39 engages the under-surface of this rail 44 and continued longitudinal movement of the food holder causes its tray portion defined by the base 35 and wall 37 to be tilted outwardly about the hinge pin 34 as a pivotal axis. An intermediate position of the tray during such movement is illustrated in full lines in FIG. 4, and continued longitudinal movement of the food holder 28 results in swinging of the tray into its outer lowermost position shown in broken lines in FIG. 4 to deliver the patty 42 carried thereby into the chute 43.

Such tray-opening movement is limited by engagement of the finger 41 with the upper surface of the left-hand end portion of a second rail 45 (FIG. 1) which is mounted on the machine frame in any suitable manner and extends upwardly across the front of the machine and curves rearwardly at its right-hand end into the right-hand broiler space 16. This second rail or tray-opening limiting means 45 not only limits opening movement of the trays comprising the second parts of the food holders 28, but also is so shaped as to be operable automatically thereafter, as the fingers 41 are carried along its upper surface, to effect tray-closing inward pivotal movement of the second parts of the food holders 28. It will be appreciated that this second rail 45 is so contoured as to maintain the trays in open position throughout the major portion of their movement transversely across the front of the machine. This permits manual placement or automatic loading of patties 42, or the like, on the then upper surface of the second wall 37. As each food holder 28 reaches the position shown in FIG. 1 at the right-hand front corner of the machine, this second rail 45 starts a relatively steep rise to effect complete closing of the tray or return to its normal position of FIG. 3. The latter portion of such closing movement of the tray is enhanced by the moment applied to the base 35 by the weight of the patty which also functions throughout the broiling cycle to maintain the tray closed and the patty disposed in vertical edge position.

It will be appreciated that as the broiling takes place within the longitudinal spaces 16, drippings of fat from the food being broiled will occur. Such drippings are conveniently caught by troughs 46 disposed on the frame base 12 and sloping downwardly from front to rear of the broiler. The rear ends of the troughs 46, as shown in FIG. 2, are open for drainage into a collecting trough 47 from which the drippings may be removed in any suitable manner.

It will be understood that one of the primary difficulties encountered in such broilers is the cleaning thereof following a production run. This invention contemplates the provision of normally inoperative deflector means which may be selectively rendered operative manually to automatically remove the food holders 28 from their supporting hangers 25. This materially assists a cleaning operation and preferably is effected so as to deliver the food holders 28 onto the chute 43. Such means is illustrated in FIGS. 3 and 5 as comprising a deflector plate 48, the rear portion of which (left end in FIG. 5) slopes upwardly and converges with a forward surface 49 which rises inwardly toward its inner edge. This deflector plate 48 is disposed in the forward portion of the left-most broiler space 16 and is pivotally supported by means of suitable brackets 51 secured in any desired manner to the upper surface of the intermediate portion 13 of the machine frame 11 and front and rear pairs of links 52 pivotally mounted at 53 at their lower ends on the brackets 51 and pivotally engaging adjacent their upper ends transverse rods 54 that may be welded or otherwise suitably secured to the under-surface of the plate 48. As seen in FIG. 5, the lower end of one of the rear links 52 extends downwardly beyond its pivot 53 and is suitably slotted to receive the laterally bent forward end of a control rod 55, the rear end of which extends outwardly from the broiler for manual operation, as indicated in FIG. 2.

As best seen in FIG. 3, the deflector plate 48 in its normal lowermost or inoperative position is disposed below and clear of the food holders 28 as the latter pass forwardly or away from the viewer in FIG. 3 through the left-hand broiler space 16. This is the full line position of the deflector plate as illustrated in FIG. 5. When it is desired to render this deflector plate operative, the manually operable control rod 55 is pulled rearwardly (to the left in FIG. 5) which swings the plate upwardly into its broken line position. It is maintained in such raised operative position until returned to normal inoperative position through the agency of the control rod 55.

When the deflector plate 48 is in its raised operative position, the rear sloping surface thereof will be engaged by the forward end of the floor 31 as each food holder 28 is moved forwardly therepast. Continued forward movement of the food holder will result in lifting of the same by the rear sloping portion of the deflector plate 48 to raise the tailpiece 39 above the rear end portion of the tray-opening rail 44. Further forward movement of the food holder relative to the deflector plate 48 will cause the same to be engaged by the outwardly and downwardly sloping forward surface 49 to further lift the food holder to disengage its hanger-engaging hook portions 27 from the apertures 26 in the associated hangers 25 and tilt the food holder outwardly. Such tilting separation of the food holder 28 from its hangers 25 will be accompanied by pivoting of its tailpiece 39 on the upper surface of rail 44 to insure dumping of the separated food holder onto the receiving chute 43. It will be appreciated that the previously described hanging of the food holders 28 from the hangers 25 carried by the chain 24 enables such removal of the food holders to be effected automatically, and it will be understood that the placement and configuration of the normally inoperative deflector means may be varied to suit the specific arrangement of the broiler structure.

It also will be appreciated, as best illustrated in FIG. 1, that the arrangement of the hangers 25 is such as to facilitate use of food holders 28 having lesser or greater widths to accommodate patties or other food pieces of different sizes. The maximum width for the holders 28 is determined only by the clearance available as the holder goes around a sprocket 21.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. In a production broiler having a frame, vertically disposed burner means mounted on said frame in spaced relationship to each other to define a plurality of open-ended broiler spaces therebetween, an endless chain, sprockets mounted on vertical axes to engage and support said chain above and vertically aligned with said broiler spaces, and motor means for drivingly rotating at least one of said sprockets, hangers spaced from each other along and secured to said chain in depending relationship for continuous movement longitudinally of said broiler spaces in response to operation of said motor means, and food holders readily removably carried in depending relationship by said hangers for continuous longitudinal movement through said broiler spaces, each said food holder having hanger-engaging portions spaced longitudinally from each other for engaging different said hangers to stabilize said food holders and avoid vertical twisting thereof, wherein each said food holder comprises a first part defining a vertical wall terminating at its lower end in an outwardly extending horizontal floor, and a second part having a base with an outer edge pivotally mounted on the outer edge of said floor and a second wall secured at its lower end to said base and defining a right angle therewith.

2. A production broiler according to claim 1, wherein said second part of each said food holder comprises a tray for a meat patty, or the like, whereby the weight of a said patty therein on said base normally maintains said tray in closed position with said second wall vertical and said patty disposed on edge between said walls.

3. A production broiler according to claim 2, wherein said second wall of each said food holder is secured to said base a substantial distance inwardly from said outer edges to assure a maximum tray-closing force being exerted by a patty on said base.

4. A production broiler according to claim 2, wherein said walls, floor and base of each said food holder comprise rods disposed parallel to each other with the outer ends of those defining said floor and base formed into loops, and a hinge pin extending through said loops to pivotally secure said first and second parts together.

5. In a production broiler according to claim 2, a delivery chute, and tray-opening means cooperating with said second part of each said food holder to effect outward pivotal movement thereof relative to said first part as said holder approaches said chute to automatically deliver a said patty in said holder to said chute.

6. A production broiler according to claim 5, wherein said tray-opening means comprises a rail on said frame and a tailpiece extending outwardly from each said second part for cooperation therewith.

7. In a production broiler according to claim 5, limiting means terminating tray-opening movements of said second parts by said tray-opening means and operable automatically thereafter to effect tray-closing inward pivotal movement of said second parts.

8. A production broiler according to claim 7, wherein said limiting and tray-closing means comprises a second rail on said frame and a finger extending outwardly from each said second part for cooperation therewith.

9. In a production broiler according to claim 5, normally inoperative deflector means mounted on said frame rearwardly adjacent said tray-opening means and selectively operable manually to operative position to effect automatic lifting of said food holders above said tray-opening means to effect disengagement of said hanger-engaging portions thereof from said hangers and to cause said tray-opening means to cooperate therewith in tiltingly delivering such disengaged food holders into said chute.

10. In a production broiler according to claim 2, normally inoperative deflector means mounted on said frame and selectively movable to operative position for engagement by said food holders to cam the same upwardly as they are moved therepast by said chain to thereby automatically separate said hanger-engaging portions from said hangers.

11. A production broiler according to claim 10, wherein said deflector means comprises a cam plate operable to lift said food holders and tilt the upper ends thereof outwardly.

* * * * *